United States Patent
Jang et al.

(10) Patent No.: US 10,073,210 B2
(45) Date of Patent: Sep. 11, 2018

(54) LIGHT SOURCE MODULE AND LIGHTING DEVICE HAVING THE SAME

(71) Applicant: LG INNOTEK CO., LTD., Seoul (KR)

(72) Inventors: Jae Hyuk Jang, Seoul (KR); Jin Su Kim, Seoul (KR); Seung Jong Baek, Seoul (KR); Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 209 days.

(21) Appl. No.: 14/711,934

(22) Filed: May 14, 2015

(65) Prior Publication Data

US 2015/0331169 A1    Nov. 19, 2015

(30) Foreign Application Priority Data

May 14, 2014   (KR) ..................... 10-2014-0057887

(51) Int. Cl.
*F21V 8/00*  (2006.01)
*F21V 23/02* (2006.01)
(Continued)

(52) U.S. Cl.
CPC .............. *G02B 6/005* (2013.01); *B60Q 3/64* (2017.02); *F21S 43/14* (2018.01); *F21S 43/239* (2018.01); *F21S 43/245* (2018.01); *F21S 43/249* (2018.01); *F21V 23/02* (2013.01); *G02B 6/0016* (2013.01); *G02B 6/0023* (2013.01); *G02B 6/0031* (2013.01); *G02B 6/0038* (2013.01);
(Continued)

(58) Field of Classification Search
CPC .. G02B 6/0055; G02B 6/0016; G02B 6/0038; G02B 6/0053; G02B 6/0036
See application file for complete search history.

(56) References Cited

U.S. PATENT DOCUMENTS

2012/0015157 A1   1/2012   Chen et al.
2012/0106147 A1   5/2012   Kim et al.
(Continued)

FOREIGN PATENT DOCUMENTS

JP   2013-218059      10/2013
KR   10-2013-0102715   9/2013

OTHER PUBLICATIONS

Extended European Search Report issued in Application 15792295.6 dated May 30, 2017.

*Primary Examiner* — Anh Mai
*Assistant Examiner* — Zachary J Snyder
(74) *Attorney, Agent, or Firm* — KED & Associates LLP

(57) ABSTRACT

Provided are a light source module capable of providing a line shaped beam with various effects using optical patterns of both sides of a light guide layer 양측의 optical pattern, and a lighting device having the light source module. The light source module, including: a first optical layer having a first surface, a second opposite to the first surface, and a first optical pattern on the first surface or the second surface; a second optical layer having a third surface facing the second, a fourth surface opposite to the third surface, and a second optical pattern on the third surface or the fourth surface; a light guide layer on the first optical layer; and a light source part supplying an incident beam into the light guide layer.

19 Claims, 6 Drawing Sheets

(51) Int. Cl.
   *B60Q 3/64*      (2017.01)
   *F21S 43/14*     (2018.01)
   *F21S 43/239*    (2018.01)
   *F21S 43/245*    (2018.01)
   *F21S 43/249*    (2018.01)
   *F21Y 115/10*    (2016.01)

(52) U.S. Cl.
   CPC ......... *G02B 6/0053* (2013.01); *G02B 6/0055* (2013.01); *G02B 6/0073* (2013.01); *F21Y 2115/10* (2016.08)

(56) References Cited

U.S. PATENT DOCUMENTS

| | | | | |
|---|---|---|---|---|
| 2013/0335975 A1* | 12/2013 | Park | ........................ | F21V 13/02 |
| | | | | 362/297 |
| 2014/0043819 A1* | 2/2014 | Yang | .................... | G02B 6/0088 |
| | | | | 362/268 |
| 2014/0104878 A1* | 4/2014 | Chen | ........................ | G02B 27/22 |
| | | | | 362/611 |
| 2015/0036336 A1 | 2/2015 | Yang et al. | | |

* cited by examiner

LIGHT SOURCE MODULE AND LIGHTING DEVICE HAVING THE SAME

CROSS-REFERENCE TO RELATED APPLICATION

This application claims priority under 35 U.S.C. § 119 to Korean Application No. 10-2014-0057887 filed on May 14, 2014, in the Korean Intellectual Property Office, whose entire disclosure is incorporated herein by reference.

BACKGROUND

1. Field

Embodiments of the present disclosure relate to a light source module capable of having various effects on a line shaped beam using optical patterns on both sides of a light guide layer, and relate to a lighting device having the light source module.

2. Background

A LED (Light Emitting Diode) is an element converting an electrical signal into light using a compound semiconductor. It is advantageous in that a light source using the LED has low power consumption, a high color temperature, a long lifespan, and the like compared to a conventional light source.

Most of existing light source modules using an LED light source or lighting devices having the light source module are devices providing simple point light source illumination or flat illumination and has a limit in generating simple optical images. When an optical image or a line shaped beam with a three-dimensional effect is expressed by an existing light source module or lighting device, the light source module or the lighting device may display such an optical image by disposing a separate mechanical element. However, in this case, it is disadvantageous in that costs of the lighting device is increased, and it is difficult to perform installation or assembly.

As such, in the technical field of the light source module or the lighting device, a demand for a lighting product having convenience in installing, a low cost, and new functions while expressing new optical images has been increasing. However, the demand for such a lighting device has not been satisfied.

BRIEF DESCRIPTION OF THE DRAWINGS

The embodiments will be described in detail with reference to the following drawings in which like reference numerals refer to like elements wherein.

DETAILED DESCRIPTION

Figure 1:
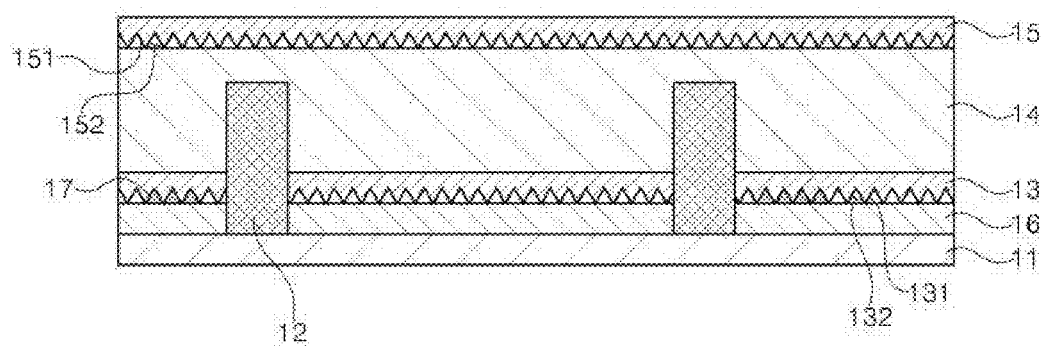
FIG. 1 is a cross-sectional view of a light source module according to one embodiment of the present disclosure.

Hereinafter, embodiments of the present disclosure that an ordinary person skilled in the art can implement will be described with reference to the accompanying drawings. The embodiments in the specification and the constructions shown in the drawings are provided as a preferred embodiment of the present disclosure, and it should be understood that there may be various equivalents and modifications which could substitute at the time of filing. In addition, when it comes to the operation principle of the preferred embodiments of the present disclosure, when the known functions or functions are seemed to make unclear the subject matters of the present disclosure, they will be omitted from the descriptions of the invention. The terms below are defined in consideration of the functions of the present disclosure, and the meaning of each term should be interpreted by judging the whole parts of the present specification, and the elements having the similar functions and operations of the drawings are given the same reference numerals. As used herein, the singular forms are intended to include the plural forms as well, unless the context clearly indicates otherwise.

Moreover, a lighting device according to the present disclosure can be applied to various lamp devices for which lighting is required, such as a lamp for a vehicle, a home lighting device, an industrial lighting device and the like. For example, when the lighting device is applied to the lamp for a vehicle, it can be also applied as a headlight, a vehicle indoor lighting lamp, a door scuff, a rear light lamp, and the like. In addition, the lighting device can be applied to all lighting-related fields that have been developed and commercialized, or can be implemented according to future technical development.

FIG. 1 is a cross-sectional view of a light source module according to one embodiment of the present disclosure.

Referring to FIG. 1, a light source module according to the present embodiment of the invention includes: a printed circuit board 11; a light source 12; a first optical layer 13; a light guide layer 14; and a second optical layer 15. The printed circuit board 11 and the light source 12 form a light source part. Also, the light source module may further include a reflective layer 16, or may further include the reflective layer 16 and an adhesive pattern 17.

According to the light source module of the present embodiment, light of the light source 12 shows three-dimensional light distribution having a stereogeometrical effect in the light guide layer 14 resulting from structural condensing generated from optical patterns 131 of the first optical layer 13. Furthermore, thanks to an arrangement structure of the first optical layer 13 and the second optical layer 15 between which the light guide layer 14 is interposed and laminated, a first region of the light source module in which the two optical layers 13, 15 face each other has a higher condensing effect than that of a second region in which the two optical layers do not face each other.

According to the present embodiment, the light source module capable of implementing a geometrical image while having an excellent condensing effect may be provided using a sheet (a first optical film and a second optical film) having specific patterns as a light source of a fluorescent lamp, illumination for a vehicle, or the like.

The constitutive elements of the light source module according to the present embodiment will be described in detail as follows.

Printed Circuit Board

As a board maintaining a circuit component, the printed circuit board (PCB) 11 refers to a circuit board in which a wiring layer or a pad part is formed by patterning a conductive layer on a fixed base substrate. A single-sided PCB, a double-sided PCB, a multi-layer PCB, an IVH (Interstitial Via Hole) PCB, a BGA (Ball Grid Array) PCB, a P-F (Rigid-Flexible) PCB, an MCM (Multi Chip Module) PCB and the like may be used as the printed circuit board 11. In the present embodiment, the printed circuit board 11 may be implemented as a flexible printed circuit board (FPCB) for securing flexibility of the light source module.

Light Source

The light source 12 is mounted to the printed circuit board 11. The light source 12 may be implemented using an LED element or a semiconductor element having a function similar thereto. The light source 12 may have a plurality of LED packages in which light emitted from the LED element overlaps with light emitted from at least one other LED element. Also, the light source 12 may receive electric power from the outside via the printed circuit board 11 and may be driven according to a control signal transmitted from the outside.

The light source 12 has side view type LED elements or a top view type LED elements. When the top view type LED elements are disposed in a side view type, the light emitted from the light source 12 straightly travels toward one side rather than straightly traveling upwards. Thus, by utilizing the light guide layer capable of a light diffusion function and a light reflection function, and the first optical layer connected to the light guide layer, a line shaped beam having a three-dimensional effect may be induced.

Also, when the top view LED elements are used as the light source 12, a total number of the light sources can be reduced due to high light efficiency compared to that of the side view type LED elements, a total weight and thickness of the light source module can be remarkably reduced.

Also, the light source part of the present embodiment may include the plurality of light sources 12, and the first optical layer 13 and the second optical layer 15 are arranged in an overlapping structure so that beams emitted from the adjacent light sources are connected into one, thereby ensuring optical images showing various condensing structures and having a higher condensing effect.

First Optical Layer

The first optical layer 13 has a first surface and a second surface opposite to the first surface. The first optical layer 13 has a sheet or film form, but is not limited thereto. Also, the first optical layer 13 may have a first optical pattern 131 on the first surface or the second surface. In the present embodiment, the first optical pattern 131 is arranged on the first surface opposite to the second surface facing the light guide layer 14.

The first optical pattern 131 may have a plurality of unit patterns arranged on the second surface in a stripe form. Also, the first optical pattern 131 may have a first pattern group in which first pattern units are sequentially arranged to have each inclined surface with a first inclination angle with respect to the first surface or the second surface, and a second pattern group in which second pattern units are sequentially arranged to have each inclined surface with a second inclination angle with respect to the first surface or the second surface. The first inclination angle and the second inclination angle may identical to each other. Furthermore, a first pattern arrangement direction of the first pattern units and a second pattern arrangement direction of the second pattern units may identical to or different from each other. In the present embodiment, the unit patterns of the multiple groups arranged in each direction intended for guiding the beams of the respect light sources are provided. Furthermore, pattern arrangement directions of the pattern units of the adjacent two groups among the multiple groups are different from each other.

According to the first optical pattern 131, the light sources belonging to a first group (see reference sign X1 in FIG. 10) and disposed at one side of an side edge extending along a lengthwise direction in the light source module having a rectangular sheet form may irradiate light in a first direction. Also, the light sources belonging to a second group (see reference sign X2 in FIG. 10) and disposed at the other side of the side edge may irradiate light in a second direction different from the first direction.

A first spaced region 132 may be provided between the first optical layer 13 and the printed circuit board 11 (or the reflective layer) due to the first optical pattern 131. The first spaced region 312 may be an air layer or a vacuum layer.

The first optical pattern 131 reflects light traveling in the light guide layer 14 from the plurality of pattern units sequentially arranged. Due to this, as an optical path is limited and luminous intensity is gradually reduced, a geometrical and optical image is generated on the first optical pattern 131. Each of the pattern units may have various cross section forms such as a prism form, a lenticular form, a tetrahedral form, a conical form, and the like. That is, the first optical layer 12 may be composed of any one of a prism sheet, a micro-lens array sheet, and a lenticular sheet, or a combination thereof.

Light Guide Layer

The light guide layer 14 functions to guide light supplied to one side of the light guide layer 14 from the one side to the other side. The light guide layer 14 may be made of glass, resin the like. That is, the light guide layer 14 of the present embodiment may be used as an existing light guide plate.

When the light guide layer 14 is made of resin, a thickness of the light guide layer may be thinly formed compared to a thickness of the light guide layer made of glass, and the flexible light guide layer 14 may be implemented. When the light guide layer 14 is used, an optical image in a line shaped light source form or a surface light source form may be efficiently implemented at an upper surface of the light guide layer 14 by inducing the light emitted from the light source 12 in a point light source form.

The resin, which can be used in the light guide layer 14, is composed of a material capable of guiding light emitted from the light source 12. The resin composed of such a material may be a UV curing resin containing an oligomer.

More specifically, a urethane acrylate oligomer may be used as the material of the resin. Also, a resin in which a urethane acrylate oligomer corresponding to a synthetic oligomer is mixed with a polymer corresponding to polyacrylic may be used as the material of the resin.

The light guide layer 14 may further contain a monomer in which BOA (isobornyl acrylate), HPA (hydroxylpropyl acrylate), 2-HEA (2-hydroxyethyl acrylate) and the like are mixed, the monomer corresponding to a low boiling point and diluted type reactive monomer. Also, a photo initiator (1-hydroxycyclohexyl phenyl-ketone and the like) or an antioxidant may be further mixed as an additive.

The materials or the additives described above are only examples. In addition to these materials, all resin materials, which have been developed or can be implemented according to future technical development, may be used in forming the light guide layer.

Also, when the light guide layer 14 is implemented as a resin layer, a plurality of beads (not drawn) having hollow parts may be dispersively disposed in a specific region or an entire region inside the light guide layer 14. These beads function to increase a light reflection and diffusion property. That is, when the beads are used, the concentration or diffusion of light may be efficiently removed from a specific region at an arrangement angle of the first optical layer 13 and the second optical layer 15 having an overlapping arrangement structure.

The beads may be made of any one selected from among silicon, silica, glass bubble, PMMA (Polymethyl methacrylate), urethane, Zn, Zr, $Al_2O_3$, and acryl, and a diameter of the bead may range from about 1 to 20 μm, but is not limited thereto. Furthermore, a content of the bead may be appropriately adjusted in consideration of a light diffusion effect. For example, when the beads are dispersively arranged on the light guide layer 14, a content of the beads may be adjusted within the range of 0.01 to 0.3 wt % based on a total weight of the light guide layer 14.

In the present embodiment, when the light guide layer 14 is implemented as the resin layer, due to presence of the resin layer, the thickness of the light guide layer occupied by the glass and the like may be remarkably reduced, and the light source module may be produced in a slimming structure or may be produced in a sheet form. Moreover, since the light source module may have a flexible property, the light source module can be easily applied to various applications, and the degree of freedom in a product design can be improved.

Second Optical Layer

The second optical layer 15 has a third surface facing the second surface of the first optical layer 13, and a fourth surface opposite to the third surface. The second optical layer 15 may have a sheet or film form, but is not limited thereto. Also, the second optical layer 15 may have a second optical pattern 151 on the third surface or the fourth surface. In the present embodiment, the second optical pattern 151 is arranged on the second surface of the first optical layer 13 and the third surface facing an upper surface of the light guide layer 14.

A second spaced region 152 may be provided between the second optical layer 15 and an upper surface of the light guide layer 14 due to the second optical pattern 151. The second spaced region 152 may be an air layer or a vacuum layer.

Like the first optical layer 13, the second optical layer 15 may be composed of at least one of a prism sheet, a micro-lens array sheet, and a lenticular lens sheet. That is, each of the pattern units of the second optical pattern 151 of the second optical layer 15 may have various cross section forms such as a prims form, a lenticular form, a rectangular form, a conical form, and the like.

By the aforesaid configuration, the second optical pattern 151 refracts, from the second pattern units, light directly traveling from the light guide layer 14, or light reflected from the first optical pattern 131 and passing through the light guide layer 14, thereby discharging the light in a fourth surface direction to which the fourth surface faces.

The second optical layer 15 may be the same member as the first optical layer 13 or may be an optical film having an optical pattern that can be applied to the first optical layer 13.

The aforesaid first optical layer 13 and the second optical layer 15 may be formed by processing an optical film without being limited thereto, namely, the first and second optical layers may be formed by all methods, which have been developed and commercialized or can be implemented according to future technical development, such as a method of attaching a film having an optical pattern to a light guide member (base member), and the like Reflective Layer The reflective layer 16 is disposed on the printed circuit board 11. The reflective layer 16 reflects light passing through the first optical layer 13 and traveling a lower portion of the light source module, thereby supplying the light to the first optical layer 13 or the light guide layer 14. The reflective layer 16 is made of a material having high reflection efficiency, thereby functioning to reduce the loss of light of the light source module. The reflective layer 16 may be implemented in a film form and may be made of a synthetic resin dispersively containing a white pigment in order to realize a property for facilitating the reflection or dispersion of light.

For example, titanium oxide, aluminum oxide, zinc oxide, lead carbonate, barium sulfate, calcium carbonate, and the like may be used as the white pigment, and polyethylene terephthalate, polyethylene naphthalate, acrylic resin, polycarbonate, polystyrene, polyolefin, cellulose acetate, weather resistant vinyl chloride, and the like may be used as the synthetic resin without being limited thereto.

Also, according to some embodiments, the reflective layer 16 may be made of Ag, Al, stainless steel (e.g., 304SS) and the like. In this case, durability of the reflective layer 16 can be increased, light efficiency of the light source module can be improved.

An adhesive pattern 17 may be further provided on a surface of the reflective layer 16. The adhesive pattern 17 forms the first spaced region 132 surrounded by an adhesive material between the reflective layer 16 and the first optical layer 13. The first spaced region 132 is formed as an air layer or a vacuum layer. When the first spaced region 132 is formed, a three-dimensional effect can be improved by the air layer, and various design effects of a three-dimensional line shaped beam can be implemented by a difference in refractive index between a portion of the air layer and a portion of the adhesive material.

Meanwhile, when an adhesive such as a double-sided tape and the like is used in a state where the first spaced region 132 is formed, a defective external image maybe easily generated due to pollution generated during a manufacturing process.

Also, the adhesive pattern 17 contains a light reflecting material, and may contribute to the control of reflectance through the light reflecting material. In this case, the adhesive pattern 17 may be also referred to as a reflective pattern.

Figure 2:
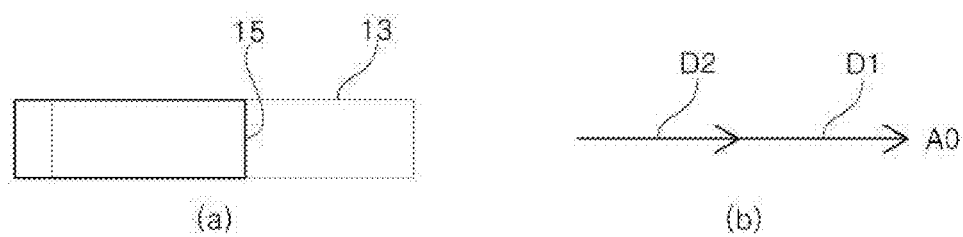
FIG. 2 is a schematic plan view showing a first arrangement of a first optical layer and a second optical layer of the light source module of FIG. 1.
Figure 3:
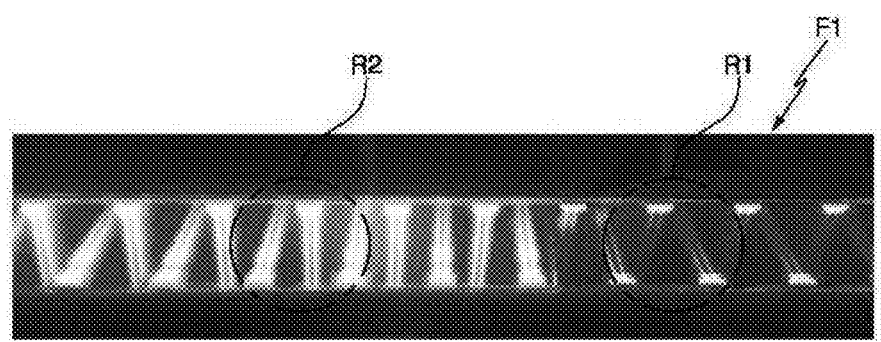
FIG. 3 is an exemplary view of an optical image resulting from the light source module of FIG. 2.

FIG. 2 is a schematic plan view showing a first arrangement of a first optical layer and a second optical layer of the light source module of FIG. 1. FIG. 3 is an exemplary view of an optical image resulting from the light source module of FIG. 2.

Referring to FIG. 2, when the first optical layer 13 is arranged in a first direction D1, the second optical layer 15 may be disposed in a second direction D2 identical to the first direction D1. In this case, an angle A0 between a first reference line of the first optical layer 13 and a second reference line of the second optical layer 15 becomes zero.

Here, when the first optical layer 13 has a rectangular sheet form, the first reference line may be a straight line placed in the first direction D1 extending in a lengthwise direction of the first optical layer. Also, when the first optical layer 13 has a circular, quadrangular, or polygonal sheet form, the first reference line may be a straight line placed in a pattern extension direction to which at least one pattern unit of the first optical pattern extends, or a pattern arrangement direction at which the pattern units are sequentially arranged. The second reference line may be set in the same way as that of the first reference line.

As shown in an image F1 of FIG. 3, it can be confirmed that when the second optical layer 15 and the first optical layer 13 are arranged in the same direction, or overlap with each other with the light guide layer at its center so that an inclination angle therebetween becomes zero, a second region R2 causing overlapping has a very excellent condensing effect compared to a first region R1 of the first optical layer 13 not causing overlapping.

Figure 4:
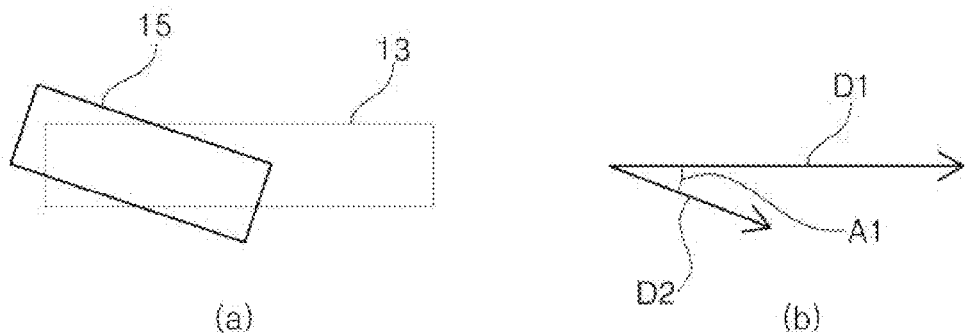
FIG. 4 is a schematic plan view showing a second arrangement of the first optical layer and the second optical layer of the light source module of FIG. 1.
Figure 5:
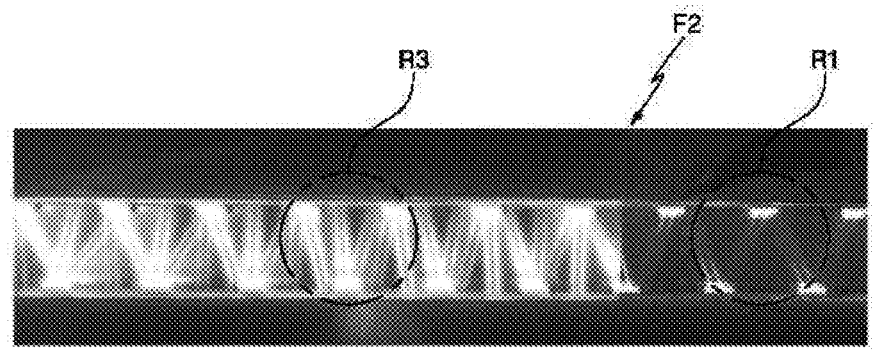
FIG. 5 is an exemplary view showing an optical image resulting from the light source module of FIG. 4.

FIG. 4 is a schematic plan view showing a second arrangement of the first optical layer and the second optical layer of the light source module of FIG. 1. FIG. 5 is an exemplary view showing an optical image resulting from the light source module of FIG. 4.

Referring to FIG. 4, when the first optical layer 13 is arranged in a first direction D1, the second optical layer 15 may be disposed in a second direction D2 inclined to have a fixed angle A1. In this case, an angle A1 between a first reference line of the first optical layer 13 and a second reference line of the second optical layer 15 becomes an acute angle larger than zero.

As shown in an image F2 of FIG. 5, it can be confirmed that when the second optical layer 15 and the first optical layer 13 are arranged to be inclined at the fixed angle A1, a third region R3 causing overlapping has a very excellent condensing effect compared to the first region R1 of the first optical layer 13 not causing overlapping. In particular, it can be confirmed that condensing performance of the third region R3 is superior than that of the second region R2 shown in the image F1 of FIG. 3.

Figure 6:
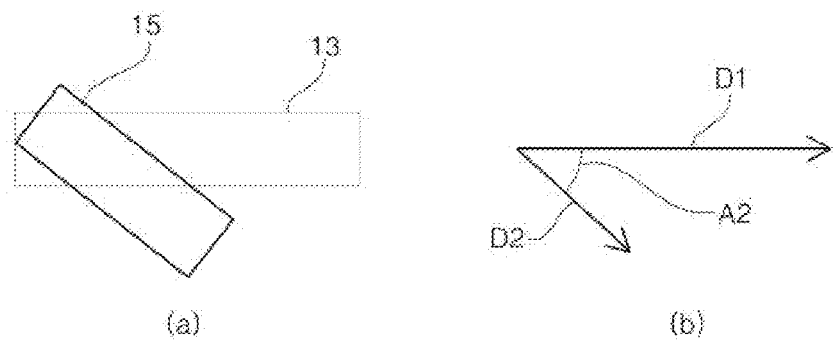
FIG. 6 is a schematic plan view showing a third arrangement of the first optical layer and the second optical layer of the light source module of FIG. 1.
Figure 7:
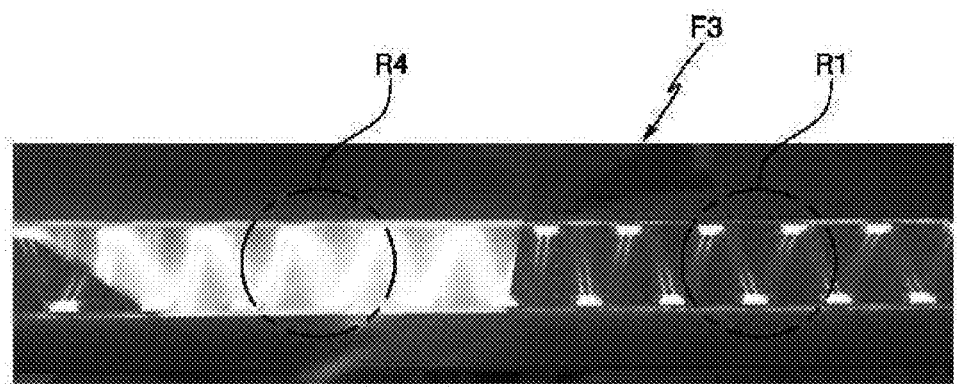
FIG. 7 is an exemplary view of an optical image resulting from the light source module of FIG. 6.

FIG. 6 is a schematic plan view showing a third arrangement of the first optical layer and the second optical layer of the light source module of FIG. 1. FIG. 7 is an exemplary view of an optical image resulting from the light source module of FIG. 6.

Referring to FIG. 6, when the first optical layer 13 is arranged in a first direction D1, the second optical layer 15 may be disposed in a second direction D2 inclined to make a fixed angle A2 with the first direction D1. In this case, an angle A2 between a first reference line of the first optical layer 13 and a second reference line of the second optical layer 15 becomes an acute angle larger than the angle A1 shown in FIG. 4.

As shown in an image F3 of FIG. 5, it can be confirmed that when the second optical layer 15 and the first optical layer 13 are arranged to be inclined at the fixed angle A2, a fourth region R4 causing overlapping has a very excellent condensing effect compared to the first region R1 of the first optical layer 13 not causing overlapping. In particular, it can be confirmed that condensing performance of the fourth region R4 is superior than that of the third region R3 shown in the image F2 of FIG. 5.

According to the aforesaid embodiment, as the second optical layer 15 and the first optical layer 13 are arranged to overlap with each other, it can be provided with the light source module having very excellent condensing performance compared to that of the light source module in which the second optical layer is not used, or the first optical layer 13 not overlapping with the second optical layer 15 is used.

Figure 8:
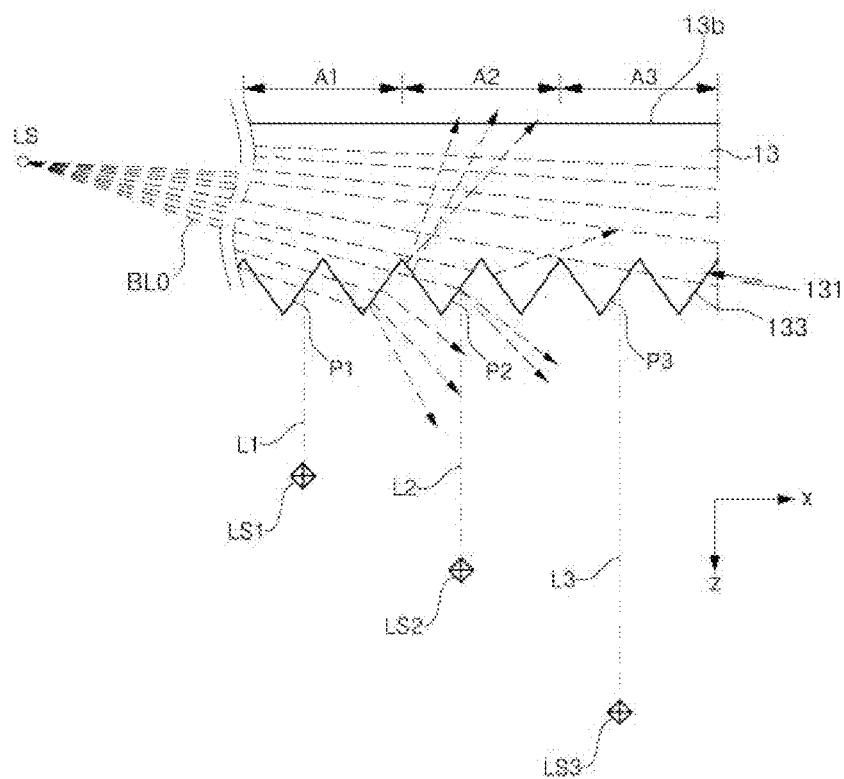
FIG. 8 is a partially enlarged cross-sectional view of the first optical layer for explaining the principle of generation of a line shaped beam from the light source module of FIG. 1.

FIG. 8 is a partially enlarged cross-sectional view of the first optical layer for explaining the principle of generation of a line shaped beam from the light source module of FIG. 1;

Referring to FIG. 8, an incident beam BL0 emitted from a light source LS and passing through the inside of the light guide layer travels the inside of the light guide layer within the scope of an incidence angle less than a critical angle determined by a refractive index of the light guide layer, and a refractive index of an external medium (atmosphere). At this time, when the incident beam BL0 meets the first optical pattern 131, since the incident beam BL0 is refracted and reflected from an inclined surface 133 of the first optical pattern 131, a traveling direction of the incident beam is changed, and accordingly, the incident beam travels to the light guide layer through a second surface 13b of the first optical layer 13. Here, a beam traveling to a first surface direction of the first optical layer 13 is reflected by the reflective layer and is refracted from the first optical pattern 131, thereby traveling to the light guide layer.

In this case, the respective unit patterns of the first optical pattern 131 serve as indirect light sources irradiating the incident beam in a second surface direction to which the second surface 13b faces by refracting or reflecting the incident beam through each inclined surface 133. That is, the pattern units of the first optical pattern 131 serve as direct light sources LS1, LS2, LD3 located far away from a reference point as an optical path is gradually increased according to a distance with the light source LS as viewed from the fixed reference point (or an observation point) of the outside of the light source module For example, when the unit patterns are sequentially arranged in one direction (x-direction), provided that a first unit pattern P1 of the first region A1, a second unit pattern P2 of the second region A2, and a third unit pattern P3 of the third region A3 are present, a second optical path corresponding to a movement distance of the incident beam reaching the second unit pattern P2 from the light source LS is longer than a first optical path between the light source LS and the first unit pattern P1, and is smaller than a third optical path between the light source LS and the third unit pattern P3. Like such a relation between the optical paths, when it is observed that a second indirect light source L2 by the second unit pattern P2 is positioned at a second distance L2 from the reference point, it is observed that a first indirect light source L1 by the first unit pattern P1 is positioned at a first distance nearer to the reference point than the second distance, and it is observed that a first indirect light source LS3 by the third unit pattern P3 is positioned at a third distance farther away from the reference point than the second distance. Thanks to a distance difference between the unit patterns, a difference between the optical paths, or a difference in luminous intensity resulting from the optical paths, a line shaped beam traveling in a direction crossing at right angles to an extending direction of the pattern units (pattern extension direction) may be disposed on the first optical pattern 131 while showing a three-dimensional effect.

As such, when the first optical layer 13 having the first optical pattern 131 is used, a line shaped beam having three-dimensional effect may be implemented in the light guide layer disposed on the first optical layer 13, wherein the line shaped beam is implemented in such a manner that the indirect light sources in a multiple point light source form and sequentially arranged along a first path limited by each pattern extension direction of the pattern units are located farther away gradually from a direction at which the unit patterns are arranged (pattern arrangement direction), or luminance is gradually reduced.

The line shaped beam with the three-dimensional effect refers to an optical image having a perceptional depth, the optical image showing that the line shaped beam limited by a predetermined optical path (first path) according to a pattern design of the first optical layer 13 is gradually entered to the light guide layer from a thickness direction of the light guide layer.

In order to implement the line shaped beam with the three-dimensional effect, at least one portion of the inclined surface 133 provided at each unit pattern of the first optical pattern according to the present embodiment is formed as a mirror surface. Here, the mirror surface refers to a smooth surface having an arithmetic mean roughness Ra of 0.02 or less, and a maximum height roughness Ry of 0.03 or less.

With regard to the first to third unit patterns P1, P2, P3 of the first optical pattern 131, the second unit pattern P2 may be a unit pattern just located next to the first unit pattern P1 on the light guide layer as viewed from the light source LS, or may be unit patterns located by placing the first unit pattern P1 and the other unit patterns in a fixed number therebetween. Similarly, the third unit pattern P3 may be a unit pattern just located next to the second unit pattern P2 on the light guide layer as viewed from the light source LS, or may be unit patterns located by placing the second unit pattern P2 and the other unit patterns in a fixed number therebetween.

A distance between two adjacent unit patterns may range from about 10 to 500 μm. When the distance is beyond the range, it is difficult for the unit patterns to properly perform a function as indirect light sources in which the unit patterns are sequentially arranged. Also, when the distance is smaller than 10 μm, it may be difficult to easy implement the optical pattern, and when the distance is larger than 500 μm, it may be difficult to implement a line shaped beam within a fixed area.

Figure 9:
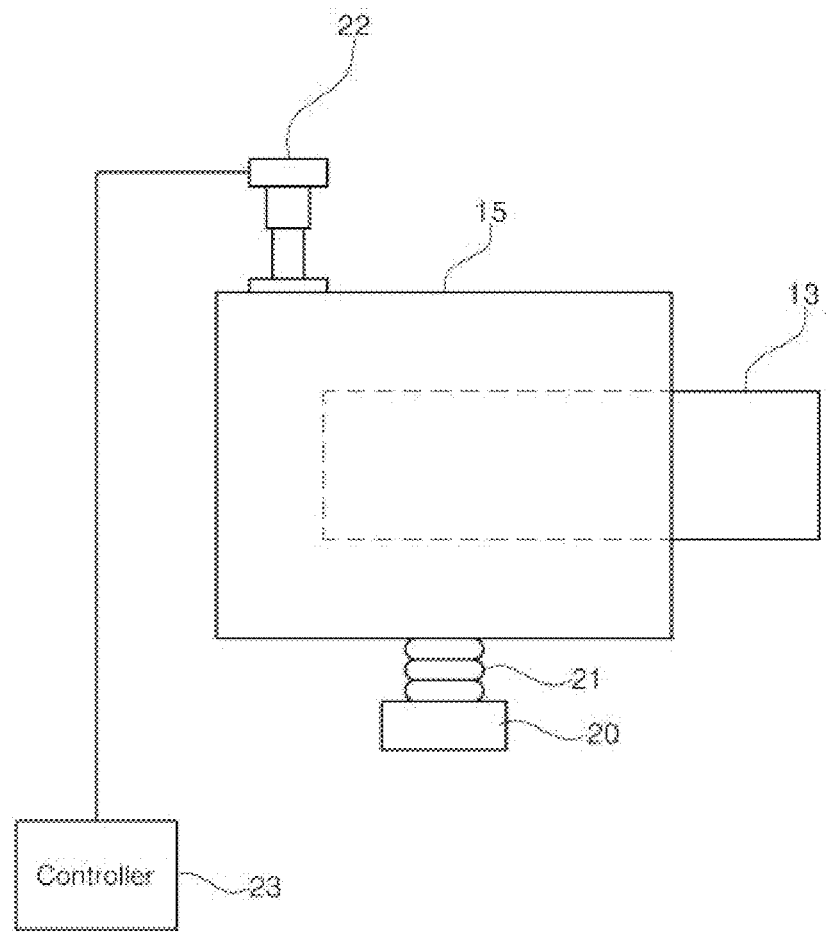
FIG. 9 is a conceptual view illustrated for explaining a driving part controlling an arrangement of the first optical and the second optical of the light source module of FIG. 1.

FIG. 9 is a conceptual view illustrated for explaining a driving part controlling an arrangement of the first optical and the second optical of the light source module of FIG. 1.

Referring to FIG. 9, the light source module according to the present embodiment includes: the first optical layer 13; the second optical layer 15, and a driving part. The first optical layer 13 may be integrally laminated on the light guide layer, and the second optical layer 15 may be disposed to be separated from the first optical layer 13 and the light guide layer so that a relative position therewith can be changed.

The second optical layer 15 may be elastically, rotatably, or movably supported by an elastic member 21. The elastic member 21 may be implemented using a spring and the like, and may be installed between the second optical layer and a fixing part 20, such as a frame, a housing, or the like.

The driving part has an actuator 22 and a controller 23 and applies pressure to at least one side of the second optical layer 15 by operating the actuator through a control signal of the controller 23. The second optical layer 15 may be arranged to overlap with the first optical layer 13 in a form illustrated in FIG. 2, FIG. 4, or FIG. 6 due to pressure of the driving part.

The actuator 22 may be a means for allowing the second optical layer 15 to perform a reciprocating motion using a pump, a motor, and the like, or may be a constitution part of the lighting device performing a function corresponding to this means. As an electric control device connected to a place or a product in which the lighting device is installed, the controller 23 may be the processor of any computer device in a building or a wireless device connected to the lighting device via a network in the corresponding building when the lighting device is installed at a house, a factory, or a company.

According to the present embodiment, optical images having various condensing effects may be expressed by automatically changing an overlapping arrangement structure of the first optical layer 13 and the second optical layer 15 of the light source module through a predetermined program, or by conveniently changing the arrangement structure using any remote control device.

Meanwhile, the aforesaid embodiment shows that the overlapping arrangement structure of the first optical layer and the second optical layer are changed by changing a position or location of the second optical layer 15. However, the present disclosure is not limited to such a configuration. The structure may be configured so that the position or the location of the first optical layer 13 can be changed. At this time, the first optical layer 13 may move with the light guide layer. Since the change of the position or location of the first optical layer is substantially identical to the change of the position or location of the second optical layer 15, the detailed description thereof is omitted.

Figure 10:
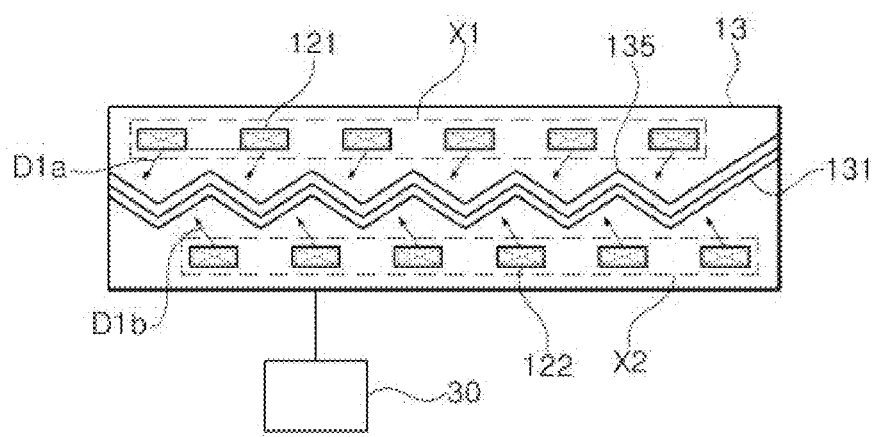
FIG. 10 a schematic view for one example of a combination structure of a light source and the first optical layer of the light source module of FIG. 1.

FIG. 10 is a schematic view showing one example of a combination structure of the light source and the first optical layer of the light source module.

Referring to FIG. 10, the light source module according to the present embodiment has a plurality of light sources exposed to the first optical layer 13. The light sources have light sources in a first group X1 and disposed at any one of both side edges extending along a lengthwise direction of the first optical layer 13 having a rectangular sheet form, and light sources 122 in a second group X2 and disposed at the remaining one of the both side edges.

The first optical layer 13 may have optical patterns disposed in regions facing the respective light sources. The optical patterns may be substantially identical to those of the second optical layer except for a pattern arrangement direction or a pattern extension direction. For example, the first optical pattern 131 may have unit patterns extending in a zigzag form to be bent from a boundary between the adjacent regions along a lengthwise direction in the first optical layer 13. A bending part 135 may be positioned at the boundary.

According to the present embodiment, in the light source module with a rectangular sheet form, when the light sources in the first group X1 irradiate light to a first direction D1a, and the light sources in the second group X2 irradiate light to a second direction D1b different from the first direction, condensing performance of a line shaped beam with a three-dimensional effect may be increased, and various optical images may be implemented through different kinds of condensing performance.

Meanwhile, in the present embodiment, the printed circuit board to which the light sources 121, 122 are mounted is connected to a separate power supply part 30 so that electric power of the power part 30 can be transmitted to the light sources 121, 122. The power supply part 30 may be a vehicle battery. In the aforesaid case, the lighting device having the light source module of the present embodiment may be mounted to a vehicle as a lighting device for a vehicle and may be driven by electric power of the vehicle battery.

Figure 11:
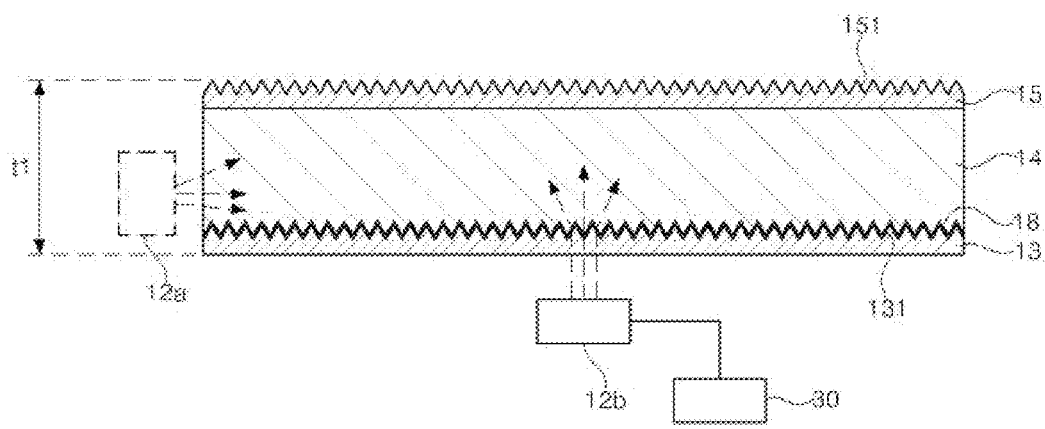
FIG. 11 is a cross-sectional view of a light source module according to another embodiment of the present disclosure.

FIG. 11 is a cross-sectional view of a light source module according to another embodiment of the present disclosure.

Referring to FIG. 11, the light source module according to the present embodiment includes: a light source 12b, a first optical layer 13, a light guide layer 14, a second optical layer 15, and a coating layer 18. Furthermore, the light source module may be connected to the power supply part 30.

According to the light source module of the present embodiment, the first optical layer 13, the coating layer 18, the light guide layer 14, and the second optical layer have a sheet form in which these layers are laminated in order as described. A thickness t1 of the laminated body in the sheet form may range from about 100 to 500 μm. Also, a thickness t1 of the laminated body may range from about 100 to 250 μm. In this case, the light source module has flexibility which allows the light source module to be wound on a roll.

In the present embodiment, a first optical pattern 131 of the first optical layer 13 is buried by the light guide layer 14. That is, when the first optical pattern 131 is covered by resin, since a difference in refractive indexes between the first optical pattern and the light guide layer is small, the loss of a function of the first optical pattern 131 may be caused. For example, when a difference in the refractive indexes is 0.2 or less, an inclined surface of the first optical pattern 131 positioned between the first optical pattern and the light guide layer may not properly perform a refractive and reflective function of an incident beam. In order to prevent the loss of the function of the first optical pattern 131, in the light source module of the present embodiment, the coating layer 18 is installed on the first optical pattern 131 of the first optical layer 13.

The coating layer 18 is a metallic separation film disposed between the first optical pattern and the light guide layer so that the difference in the refractive indexes between the first optical pattern 131 and the light guide layer 14 can be maintained beyond a fixed value. If a material allows the first optical layer 13 to be separated from the light guide layer 14, the material may be used as a material of such a coating layer 18 without a limitation. For example, the coating layer 18 may be made of Ag, Al, stainless steel (304SS) and the like.

The light source 12b is disposed to irradiate light from a thickness direction of the laminated body to a central portion of the laminated body. The light source 12b may be disposed to be separated from the laminated body with the sheet form. The light source 12b is connected to the separate power supply part 30 so as to be driven by electric power of the power supply part 30. The power supply part 30 may be a vehicle battery to which a vehicle is mounted, but is not limited thereto. The power supply part 30 may be implemented with a power supply means including a secondary battery, or an adapter (transformer) connected to a commonly used power supply.

When incident beams are provided to the central portion of a lengthwise direction of the light guide layer 14, the beam incident into the light guide layer 14 by passing through the first optical layer 13 from the light source 12b may travel from the central portion of the light guide layer 14 to both side edges, and may be converted into line shaped bidirectional beams with a three-dimensional effect traveling from a middle portion to the both side edges through the first optical pattern 131 of the first optical layer 13.

Also, in a modified exemplary, the light source may be disposed to irradiate light from a side of the laminated body with the sheet form to the light guide layer 14. That is, as illustrated in FIG. 10 by dotted lines, the light source may be implemented as a light source 10a disposed at another position to irradiate light from the outside of the side of the light guide layer 14 to the inside of the light guide layer 14.

According to the present embodiment, the coating layer is disposed on the first optical pattern buried by the resin, and a boundary between the first optical pattern and the light guide layer is clearly configured so that a reflection and refraction operation can be smoothly performed from the curved surface of the first optical pattern, thereby implementing a line shaped beam with a three-dimensional effect. Furthermore, condensing performance of the line shaped beam with the three-dimensional effect may be controlled by the second optical layer overlapping with the first optical layer.

Figure 12:
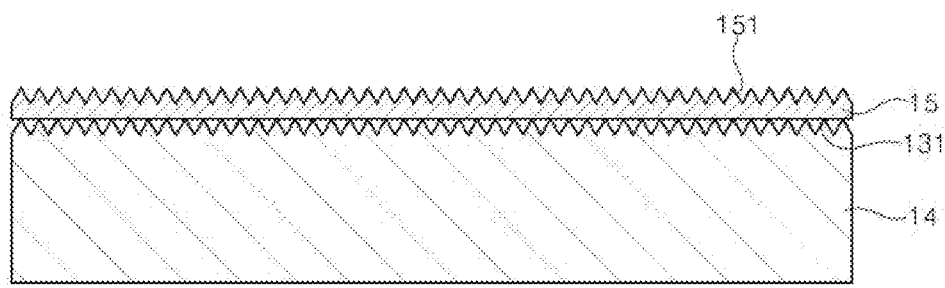
FIG. 12 is a cross-sectional view of an optical member which can be applied to the light source module of FIG. 11.

FIG. 12 is a cross-sectional view of an optical member which can be applied to the light source module of FIG. 11.

Referring to FIG. 12, an optical member, which can be applied to the light source module according to the embodiment of the present disclosure, includes: a light guide layer 14; a first optical pattern 131 integrally formed with a first surface of the light guide layer 14 by processing the first surface of the light guide layer 14, and intended for forming the first optical layer; and a second optical layer 15 intended for mounting the first optical pattern 131 and disposed on the second surface of the light guide layer 14. The second optical layer 15 has the second optical pattern 151 on the second surface.

An adhesive layer may be disposed between the first optical pattern 131 forming the first optical layer, and the second optical layer 15, wherein the adhesive layer is intended for realizing bonding between the first optical pattern and the second optical layer.

In the present embodiment, the optical member refers to a structure in which the light guide layer 14, the first optical layer, and the second optical layer 15 are laminated in order as described.

In the present embodiment, in a thickness direction of the light guide layer 14, the second optical layer 15 or the second optical pattern 151 may have the same pattern arrangement as that of the first optical pattern 131. Also, according to some embodiments, the second optical layer 15 or the second optical pattern 151 may cause overlapping so that a pattern arrangement of the second optical pattern 151 can be inclined at a predetermined angle with a pattern arrangement of the first optical pattern 131.

The present embodiment may implement an optical image based on the fact that condensing performance of a portion of the second optical pattern 151 overlapping with the first optical pattern 131 is considerably excellent compared to that of a portion of the first optical pattern 131 not overlapping with the second optical pattern 151. Moreover, the light source module capable of controlling condensing performance according to a pattern design of the optical member, and an arrangement design of the overlapping patterns, or a light device using the light source module may be provided.

Figure 13:
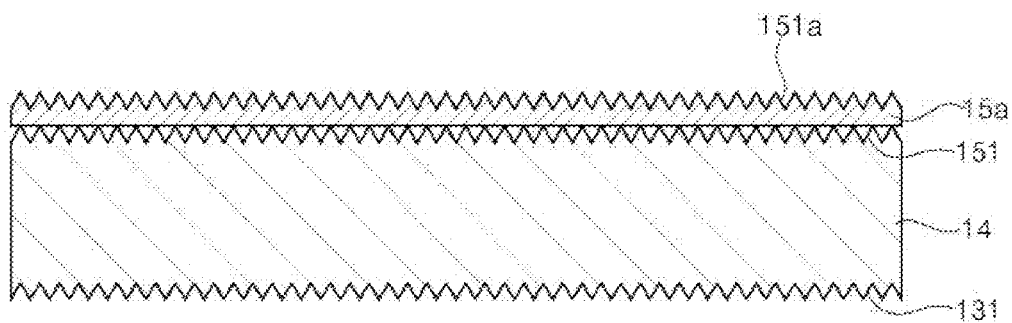
FIG. 13 is a cross-sectional view of another optical member which can be applied to the light source module of FIG. 11.

FIG. 13 is a cross-sectional view of another optical member which can be applied to the light source module of FIG. 11.

Referring to FIG. 13, the optical member, which can be applied to the light source module according to the present embodiment, includes: a light guide layer 14; a first optical pattern 131 integrally formed with a first surface of the light guide layer 14 by processing the first surface of the light guide layer, and intended for forming the first optical layer; a second optical pattern 151 integrally formed with a second surface of the light guide layer 14 by processing the second surface of the light guide layer 14, and intended for forming the second optical pattern 151; and a third optical layer 15a intended for mounting the second optical pattern 151 and disposed on the second surface of the light guide layer 14. The third optical layer 15a has a third optical pattern 151a on the second surface opposite to the first surface facing the second optical pattern 151 without being limited thereto. The third optical layer 15a may be implemented such that the third optical pattern is provided on the first surface in a state of being spaced apart from the second optical pattern 151 by a predetermined separation region.

An adhesive layer (not drawn) may be disposed between the optical layer 151 forming the second optical layer, and the third optical layer 15a, the adhesive layer being intended for bonding therebetween.

In the present embodiment, the optical member refers to a structure in which the first optical layer, the light guide layer 14, the second optical layer, and the third optical layer 15a are laminated in order as described.

In the present embodiment, in a thickness direction of the light guide layer 14, the second optical layer may have the same pattern arrangement as that of the first optical pattern 131. Also, according to some embodiments, the second optical pattern 151 may cause overlapping so that a pattern arrangement of the second optical pattern 151 can be inclined at a predetermined angle with a pattern arrangement of the first optical pattern 131. Here, the third optical pattern 151a of the third optical layer 15a may have the same pattern arrangement as that of the second pattern 151.

Also, in the thickness direction of the light guide layer 14, the third optical pattern 151a of the third optical layer 15a may have the same pattern arrangement as at least any one of the pattern arrangement of the first optical pattern 131 and the pattern arrangement of the second pattern 151. According to some embodiments, the third optical pattern 151a may cause overlapping so that the pattern arrangement of the third optical pattern 15a can be inclined at a fixed angle with at least any one of the pattern arrangement of the first optical pattern 131 and the pattern arrangement of the second pattern 151.

According to the present embodiment, the first optical pattern 131 is disposed to partially overlap with at least one of the second optical pattern 151 and the third optical pattern 151a so that a lien shaped beam with a three-dimensional effect can control the condensing performance of an overlapping portion. Thus, the light source module capable of emitting light of the surface light source as various optical images of line shaped beams in which condensing performance is controlled according to a pattern design of such an optical member and an arrangement design of the overlapping patterns can be provided, and a lighting device using the light source module can be provided.

Figure 14:
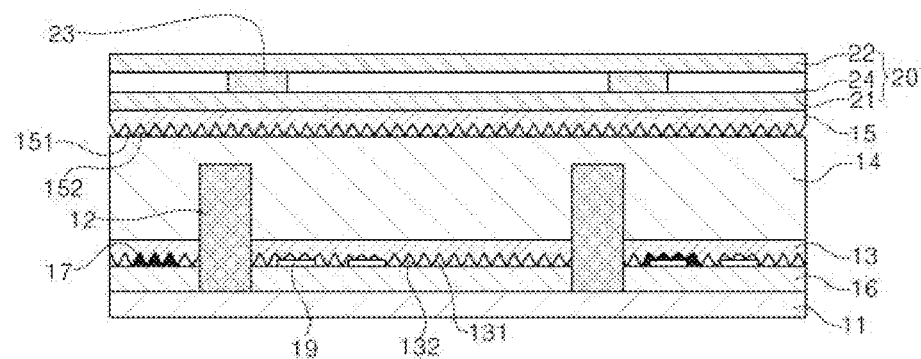
FIG. 14 is a cross-sectional view of a light source module according to a further embodiment of the present disclosure.

FIG. 14 is a cross-sectional view of a light source module according to a further embodiment of the present disclosure.

Referring to FIG. 14, the light source module according to the present embodiment includes: a printed circuit board 11; a light source 12; a first optical layer 13; a light guide layer 14; a second optical layer 15; a reflective layer 16; an adhesive pattern 17; a reflective pattern 19; a light shielding pattern layer.

In the present embodiment, the printed circuit board 11, the light source 12, the first optical layer 13, the light guide layer 14, the second optical layer 15, the reflective layer 16, and the adhesive pattern 17 are substantially identical to corresponding constitutive elements of the light source module previously described with reference to FIG. 1, and accordingly the detailed description thereof is omitted.

The reflective pattern 19 functions to scatter and disperse light traveling from a lower portion of the first optical layer 13, namely, a first surface of the first optical layer 13 to the reflective layer 16. In order to effectively control reflectance for a specific region of the reflective layer 16, the reflective pattern 19 may be disposed to be adjacent to a light emitting surface of the light source 12.

The reflective pattern 19 may be formed by printing a surface of the reflective layer 16 with an ink containing any one of $TiO_2$, $CaCO_3$, $BaSO_4$, $Al_2O_3$, silicon, and PS (Polystyrene). The reflective pattern 19 may be formed in a dot pattern-like shape, a prism shape, a lenticular shape, a lens-like shape, or a combination thereof without being limited thereto.

When at least any one of the adhesive pattern 17 and the reflective pattern 19 is used, a first spaced region 132 formed between the first optical layer 13 and the reflective layer 16 by the first optical pattern 131 may be limited to a specific shape or form. When the adhesive pattern 17 and/or the reflective pattern 19, and the first spaced region 132 are used, the uniformity of light may be increased or reduced from a specific region of the light source module.

The light shielding pattern layer has a light shielding pattern 23, and is disposed on the light guide layer 14 located at an upper portion of the light source 12 or the second optical layer 15. In the present embodiment, the light shielding pattern layer is disposed on the second optical layer 15 without being limited thereto. The light shielding pattern layer may be disposed between the light guide layer 14 and the second optical layer 15. In particular, when the light shielding pattern layer is configured so as to change an angle of the second optical layer 15 with respect to the first optical layer 13, the light shielding pattern layer may be disposed on the light guide layer 14 and may be arranged in a state of being separated from the second optical layer 15.

The light shielding pattern 23 may prevent light emitted from the light source 12 from forming a hot spot just above the light source 12 and damaging an external image. To do so, the light shielding pattern 23 is disposed on the second optical layer 15 or the light guide layer 14 of the upper portion of the light source 12 to cover a front portion of the light emitting surface in a predetermined length.

The light shielding pattern 23 is formed by performing a printing process on one surface of a single base substrate, and the base substrate is disposed on the second optical layer 15 or the light guide layer 14. Here, the base substrate may be provided with a transparent film of PET (Polyethylene terephthalate), PS (Polystyrene), and the like having excellent light transmittance.

As such, the light shielding pattern layer may be implemented using the single base substrate, but the present disclosure is not limited thereto. For example, the light shielding pattern layer may be configured such that light shielding patterns are disposed between two base substrates. That is, the light shielding pattern 23 is aligned between an upper surface of the first optical sheet 21 and a lower surface of the second optical sheet 22 at an upper portion of the light source 12 so as to be disposed to block the concentration of light emitted from the light source 12.

Also, the light shielding pattern 23 may be implemented so as to perform a function of partially shielding and diffusing the light, as well as a function of completely block the light, namely, so as to adjust a light shielding level or a light diffusing level. To do so, the light shielding pattern 23 may be implemented in an overlapping print structure of composite unit patterns. The overlapping print structure refers to a structure resulting from forming one pattern and printing another pattern thereon.

As one example, the light shielding pattern 23 may be implemented by forming a first layer for light diffusing unit patterns using an ink contacting at least one material selected from among $TiO_2$, $CaCO_3$, $BaSO_4$, $Al_2O_3$, silicon, and by forming a second layer for light shielding unit patterns on the first layer for the light diffusing patterns using an ink containing Al, or a mixture of Al and $TiO_2$. That is, the light shielding pattern 23 may be provided by forming the first layer for the light diffusing patterns on a surface of a polymeric film using white printing, and thereafter, forming the second layer for the light shielding unit patterns thereon. Also, after the second layer for the light shielding unit patterns has been formed on the polymeric film, the first layer for the light diffusing unit patterns may be formed. It is obvious that a formation design of the light shielding pattern 23 may be variously modified in consideration the efficiency and intensity of light, and a light shielding rate.

Also, according to some embodiments, the light shielding patterns 23 may be formed in a triple structure in which an intermediate layer of a metal pattern is interposed between the first layer for the light diffusing unit patterns and the second layer for the light diffusing unit patterns. The intermediate layer of the metal pattern corresponds to a layer for the light shielding unit patterns. With regard to such a triple structure, $TiO_2$ having an excellent refractive index may be used as a material of the layer for the light diffusing unit patterns, or $CaCO_3$ having light stability and excellent color sensitivity may be used with $TiO_2$. Furthermore, Al having an excellent concealing property may be used as a material of the layer for the light shielding unit patterns. When the light shielding pattern with the triple structure containing $CaCO_3$ is used, stable white light may be implemented by a function of decreasing the exposure of yellowish light.

Also, in implementing the light shielding pattern 23, in addition to $CaCO_3$, inorganic materials having a large particle size and a similar structure, such as $BaSO_4$, $Al_2O_3$, silicon beads, and the like, may be utilized. Moreover, in terms of light efficiency, it is preferable that the light shielding pattern 23 be formed by adjusting a pattern density so that the pattern density is reduced as the light shielding pattern is gradually apart from a light emitting direction of the light source 12.

According to the present embodiment, a reduction of optical properties of the light source module, and the loss of an external image, such as a yellowish phenomenon generated because light emitted from the light source is excessively strong at a portion just above the light source, can be prevented.

Also, even though it is not illustrated, at least one optical sheet may be further formed on the second optical sheet (22) according to some embodiments.

As set forth above, according to some embodiments of the present disclosure, a light source module capable of providing a line shaped beam with various effects such as a three-dimensional effect, an overlapping effect, and the like using optical patterns with each inclined surface composed of a mirror-surface and optical patterns of both sides of the light guide layer can be provided. That is, the light source module can simply provide the line shape beam having a three-dimensional effect with various design effects using an arrangement relation of a plurality of optical layers between which a resin layer is interposed, and a lighting device having the light source module can be provided.

Also, according to some embodiments of the present disclosure, a lighting device having a light source module, which has a curvature and convenience in producing and installing by being produced in a sheet form, and which can be easily applied to a housing or a lighting application, can be provided, and a lighting device having the light source module can be provided.

Also, according to some embodiments of the present disclosure, a light source module in which the shape (including a shape with a three-dimensional effect) of an outputted optical image is changed according to a viewing angle by using optical layers having optical patterns and a light guide layer between the optical layers can be provided, and a lighting device including the light source module can be also provided.

The exemplary embodiments of the present disclosure have been made keeping in mind the above problems. An aspect of exemplary embodiments of the present disclosure is to provide a light source module capable of providing a line shaped beam with various effects such as a three-dimensional effect, an overlapping effect, and the like using optical patterns of both sides of a light guide layer.

Also, another object of the exemplary embodiments of the present disclosure is to provide a light source module having convenience in producing and installing by flexibly implementing it in a sheet form, and capable of being easy applied to a housing having a curve or a lighting application, and to provide a lighting device having the light source module.

In order to accomplish the above objects, according to an aspect of the exemplary embodiments of the present disclosure, a light source module may include: a first optical layer having a first surface, a second opposite to the first surface, and a first optical pattern on the first surface or the second surface; a second optical layer having a third surface facing the second, a fourth surface opposite to the third surface, and a second optical pattern on the third surface or the fourth surface; a light guide layer on the first optical layer; and a light source part supplying an incident beam into the light guide layer. Here, the first optical pattern comprises a plurality of pattern units sequentially arranged and having each inclined surface having an inclination angle with respect to the first surface or the second surface, wherein the pattern units guide the incident beam to a first surface direction to which the first surface faces, or a second surface direction to which the second surface faces through refraction and reflection of the inclined surfaces, thereby converting it into a line shaped beam of a first path extending in a direction crossing at right angles to each pattern extension direction of the pattern units.

In one embodiment, the second optical layer may overlap with the first optical layer so that an arrangement of the second optical pattern is identical to an arrangement of the first optical pattern.

In one embodiment, the second optical layer second optical layer may overlap with the first optical layer so that the second optical pattern is arranged in a different arrangement method from that of the first optical pattern. At least one pattern extension direction or pattern arrangement direction of the second optical pattern may be different from that of the first optical pattern.

In one embodiment, the first optical pattern may have: a first pattern group in which first pattern units are sequentially arranged to have each inclined surface with a first inclination angle with respect to the first surface or the second surface; and a second pattern group in which second pattern units are sequentially arranged to have each inclined surface with a second inclination angle with respect to the first surface or the second surface. A first pattern arrangement direction of the first pattern units and a second pattern arrangement direction of the second pattern units may be different from each other.

In one embodiment, the inclined surface may include a mirror surface having an arithmetic mean roughness (Ra) of 0.02 or less and a maximum height roughness (Ry) of 0.30 or less.

In one embodiment, a distance between two adjacent pattern units among the first pattern units may range from 10 to 500 μm.

In one embodiment, light source module may include further a driving part connected to the first optical layer or the second optical layer and intended to rotate or move the second optical layer with respect to the first optical layer.

In one embodiment, a main material of the light guide layer may be resin or glass. A thickness of the light guide layer may be 0.1 mm or more and 10.0 mm or less.

In one embodiment, the light source part may include: a printed circuit board on the first surface of the first optical layer; and a light emitting diode package mounted to the printed circuit board, exposed to the second surface of the first optical layer, and buried by the light guide layer. The printed circuit board may be a flexible printed circuit board.

In one embodiment, the light source module may further include a reflective layer between the first optical layer and the light guide layer. Also, the light source module may further include a reflective pattern or an adhesive pattern between the light guide layer and the reflective layer, and may further include a spaced region disposed between the light guide layer and the reflective layer and surrounded by the reflective pattern or the adhesive pattern.

In one embodiment, the light source module may further include a coating layer disposed between the first optical layer and the light guide layer when the first optical pattern is arranged on the second surface of the first optical layer.

In one embodiment, the light source module may further include a light shielding pattern layer disposed on the light guide layer at an upper portion of the light source part.

According to another aspect of embodiments of the present disclosure, a lighting device may include: a light source module according to any one of the aforesaid embodiments; and a power supply part connected to a light source part of the light source module. The power supply part may include a vehicle battery.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light source module, comprising:
   a first optical layer having a first surface, a second surface opposite to the first surface, and a first optical pattern on the first surface or the second surface;
   a second optical layer having a third surface facing the second surface, a fourth surface opposite to the third surface, and a second optical pattern on the third surface or the fourth surface;
   a light guide layer disposed between the first optical layer and the second optical layer; and
   a light source part that supplies an incident beam into the light guide layer,
   wherein the first optical pattern includes a plurality of pattern units sequentially arranged, wherein each inclined surface of the pattern units has an inclination angle with respect to the first surface or the second surface,
   wherein the light source module comprises a first area in which the first optical layer overlaps with the second optical layer and a second area in which the first optical layer does not overlap with the second optical layer on a plane view, and
   wherein an angle between an extending direction of the pattern units of the first optical layer and an extending direction of the pattern units of the second optical layer comprises an acute angle larger than zero degrees.

2. The light source module of claim 1, wherein an intensity of a light emitted from the first area of the light source module is greater that an intensity of a light emitted from the second area of the light source module.

3. The light source module of claim 1, wherein the second optical layer overlaps with the first optical layer so that the second optical pattern is arranged with a different arrangement method from that of the first optical pattern.

4. The light source module of claim 1, wherein the first optical pattern has:
   a first pattern group in which the first pattern units are sequentially arranged to respectively have an inclined surface with a first inclination angle with respect to the first surface or the second surface; and
   a second pattern group in which the second pattern units are sequentially arranged to respectively have an inclined surface with a second inclination angle with respect to the first surface or the second surface.

5. The light source module of claim 4, wherein a first pattern arrangement direction of the first pattern units and a second pattern arrangement direction of the second pattern units are different from each other.

6. The light source module of claim 1, further comprising a driving part connected to the first optical layer or the second optical layer and intended to rotate or move the second optical layer with respect to the first optical layer.

7. The light source module of claim 1, wherein a main material of the light guide layer is resin or glass.

8. The light source module of claim 7, wherein a thickness of the light guide layer is 0.1 mm or more and 10.0 mm or less.

9. The light source module of claim 1, wherein the light source part includes a printed circuit board, and the printed circuit board is a flexible printed circuit board.

10. The light source module of claim 1, further comprising a coating layer disposed between the first optical layer and the light guide layer when the first optical pattern is arranged on the second surface of the first optical layer.

11. The light source module of claim 1, further comprising a light shielding pattern layer disposed on the light guide layer at an upper portion of the light source part.

12. A lighting device, comprising:
a light source module according to claim 1; and
a power supply part connected to a light source part of the light source module.

13. The lighting device of claim 12, wherein the power supply part comprises a vehicle battery.

14. The light source module of claim 1, wherein the light source part comprises:
a printed circuit board on the first surface of the first optical layer; and
a light emitting diode package mounted to the printed circuit board and covered by the light guide layer.

15. The light source module of claim 14, further comprising a reflective layer between the first optical layer and the printed circuit board.

16. The light source module of claim 15, further comprising a reflective pattern or an adhesive pattern between the light guide layer and the reflective layer.

17. The light source module of claim 15, comprising a first spaced region disposed between the first optical layer and the reflective layer, and a second spaced region disposed between the light guide layer and the second optical layer.

18. The light source module of claim 17, wherein an arrangement of the second spaced region is identical to an arrangement of the first spaced region on a plane view.

19. The light source module of claim 17, wherein an arrangement of the second spaced region is different from an arrangement of the first spaced region on a plane view.

* * * * *